United States Patent [19]
Perez

[11] Patent Number: 6,109,698
[45] Date of Patent: Aug. 29, 2000

[54] FAST ESCAPE CHILD SAFETY HARNESS

[76] Inventor: Philip Perez, 9 Berube La., Sanford, Me. 04073

[21] Appl. No.: 09/444,586

[22] Filed: Nov. 22, 1999

[51] Int. Cl.[7] .................................................. A62B 35/00
[52] U.S. Cl. ........................................... 297/484; 297/467
[58] Field of Search ..................... 297/484, 485, 297/468, 464, 467, 466, 483

[56] References Cited

U.S. PATENT DOCUMENTS

| | | |
|---|---|---|
| 1,048,033 | 12/1912 | Brown . |
| 2,275,450 | 3/1942 | Manson . |
| 3,480,325 | 11/1969 | Kramer . |
| 3,954,280 | 5/1976 | Roberts et al. . |
| 4,302,049 | 11/1981 | Simpson . |
| 4,540,218 | 9/1985 | Thomas . |
| 4,682,390 | 7/1987 | Parrish . |
| 4,758,048 | 7/1988 | Shuman . |
| 4,834,460 | 5/1989 | Herwig . |
| 4,867,464 | 9/1989 | Cook . |
| 5,056,869 | 10/1991 | Morrison . |
| 5,074,588 | 12/1991 | Huspen . |
| 5,306,044 | 4/1994 | Tucker . |
| 5,540,403 | 7/1996 | Standley . |
| 5,628,548 | 5/1997 | Lacoste . |
| 5,641,200 | 6/1997 | Howell . |
| 5,836,656 | 11/1998 | Baggott . |
| 5,909,927 | 6/1999 | Henshall . |

*Primary Examiner*—Milton Nelson, Jr.
*Attorney, Agent, or Firm*—Phillip E. Decker

[57] ABSTRACT

A method and apparatus for securing a child to an adult on a vehicle having lap safety belts having a first strap formed into a loop and sized for placing over the head and resting on an adult's shoulders; a first gender portion of a mating buckle assembly secured to the first strap; a second strap sized for reaching from the first strap, under the adult's torso, between the adult and child's legs, and reaching to engage the first portion of the buckle assembly, and having a mating buckle portion; a third strap secured on both ends to the strap and forming a sleeve; a forth strap suitably sized to reach around the adult and child's torso when the child is seated on the adult's lap, threaded through the sleeve, with mating buckle assemblies on both ends of the strap. When worn by an adult and child in a vehicle, with an adult wearing a lap belt, method and apparatus both restrains the child in an emergency, and allows the adult to stand up with the child secured to the adult and quickly escape from the vehicle.

16 Claims, 5 Drawing Sheets

FAST ESCAPE CHILD SAFETY HARNESS

BACKGROUND

1. Field of the Invention

The present invention relates to child safety harnesses for securing a child to an adult in a vehicle having lap belts.

2. Description of the Related Art

Many modes of public transportation use the same type of safety restraint: the lap belt. They are found on all airplanes and automobiles, and on many trains and buses. These vehicles ordinarily provide one lap belt for one seat that is designed to hold one adult.

Inevitably, adult passengers will transport a child or infant on the adult's lap without a proper safety restraint. Even though this is inherently unsafe for the child, adults transport children this way for any of several reasons. It is much less expensive when two passengers take up only one seat. It allows the adult to more closely supervise the child. The probability is low that the vehicle in which they are riding will have an emergency on any given trip. Most importantly, there is no convenient safety device available that will both restrain the child to the adult, and also permit the adult and child to quickly escape a vehicle together in an emergency.

Others have attempted to provide child safety harnesses for securing a child to an adult's lap while seated in a vehicle. One example is disclosed in U.S. Pat. No. 5,540,403, that issued on Jul. 30, 1996, to Standley, which is not admitted to be prior art by its inclusion in this background section. Standley discloses child safety harness that is secured to an adult's lap belt. However, in an emergency the adult must release the lap belt and leave the vehicle without being further secured to the child. In the case of an emergency there is likely to be a great deal of panic, and possibly smoke or other sources of disorientation making it impossible for the adult to guide a child to safety.

Another example is disclosed in U.S. Pat. No. 5,628,548, that issued on May 13, 1997, to Lacoste, which is also not admitted to be prior art by its inclusion in this background section. Lacoste discloses a complex passenger restraint system, wherein an adult and child each have to wear a harness. Like in Standley, the child is secured to the adult by a connection in the rear of the child's harness. These designs may be able to hold a child onto an adult's lap while seated. However, they would be unsuitable for quickly transporting the child out of a vehicle in an emergency with the child still secured to the adult. The child would have to be detached from the safety harness in the midst of an emergency even before the adult stood up to try to escape the vehicle.

What is needed, therefore, is a method and apparatus for securing a child to an adult in a vehicle having lap belts that enables the adult and child to quickly escape from the vehicle in an emergency.

SUMMARY

The present invention is directed to a method and apparatus that satisfies this need. A method and apparatus having the attributes of the present invention is a child safety harness comprising a first strap formed into a loop and sized for placing over the head and resting on the adult's shoulders; a first gender portion of a mating buckle assembly secured to the first strap; a second strap sized for reaching from the first strap, under the adult's torso, between the adult and child's legs, and reaching to engage the first portion of the buckle assembly, and having a mating buckle portion; a third strap secured on both ends to the strap and being suitably adapted to form a sleeve; a forth strap suitably sized to reach around the adult and child's torso when the child is seated on the adult's lap, threaded through the sleeve, with mating buckle assemblies on both ends of the strap. When worn by an adult and child in a vehicle, with an adult wearing a lap belt, the invention both restrains the child in an emergency, and allows the adult to stand up with the child secured to the adult and quickly escape from the vehicle. These and other features and embodiments of the invention will be made more clear in the following drawings and description.

DRAWINGS

DESCRIPTION

The present invention is a method and apparatus for securing a child to an adult in a vehicle having lap belts that enables the adult and child to quickly escape from the vehicle in an emergency. One embodiment of such an apparatus is shown in FIG. 1.

Figure 1:
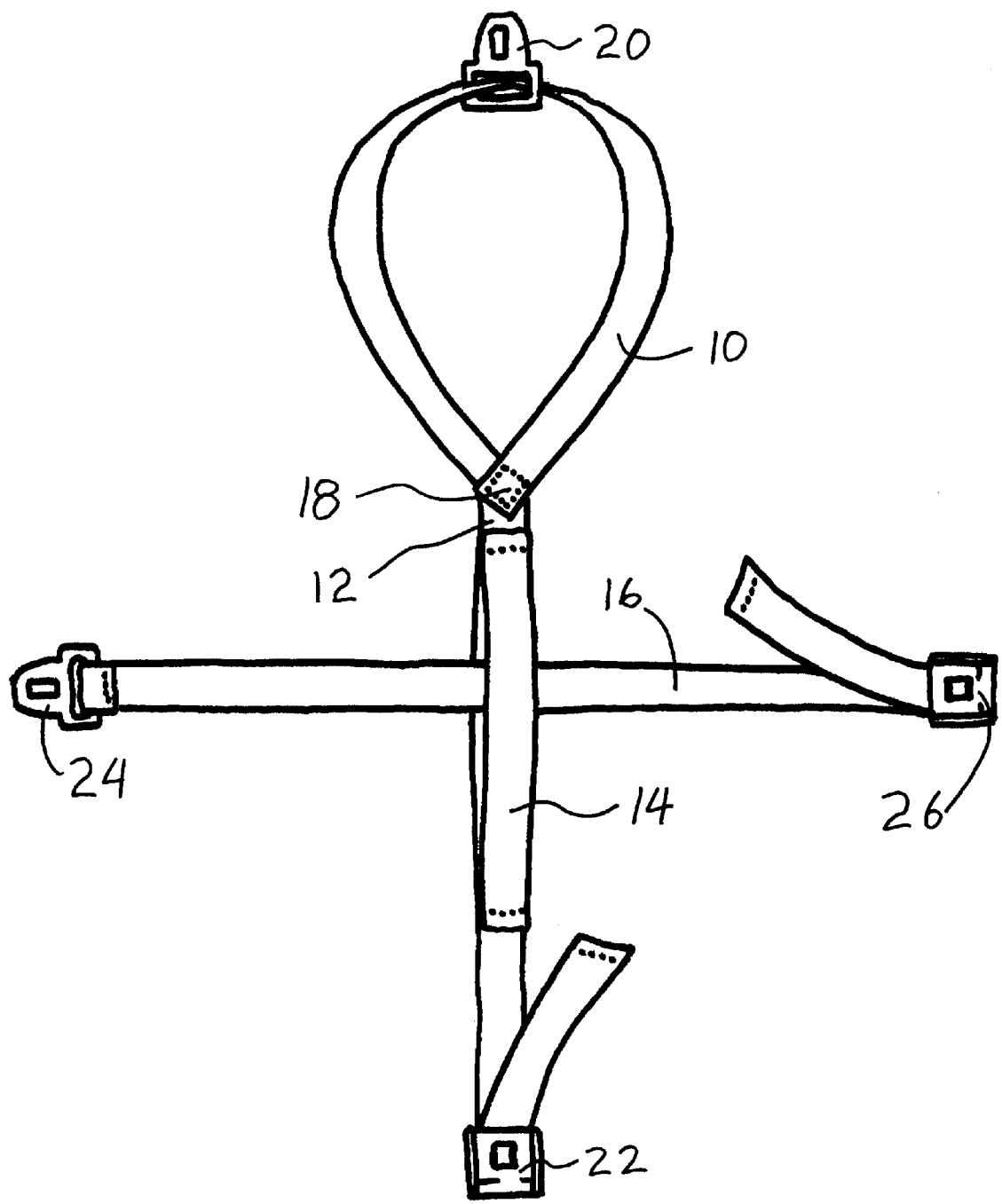
FIG. 1 is a view of the child safety harness of the present invention when laid flat.

FIG. 1 shows a child safety harness of the present invention that is assembled and laid flat for inspection. A first strap 10 is provided, and is formed into a loop by securing each end together at a junction 18. Although the drawing shows the ends of the strap 10 joined at about a ninety degree angle, almost any angle would be suitable, and they are considered to be encompassed within the scope of this invention. A first gender portion of a mating buckle assembly 20 is slidably secured to the strap 10. Alternatively, this first gender portion could be secured substantially at the middle of the strap 10. The male portion of a buckle is shown as the first gender portion 20, but it could also have been the female portion. The first and second gender portions must, of course, be of opposite genders.

A second strap 12 is also provided, and is secured at one end to the junction 18 at its loop end. A second gender portion of a mating buckle assembly 22 is adjustably secured at the other end of the strap 12 at its buckle end. The length of the second strap 12 is suitably sized to enable the strap to reach from the junction 18, under an adult's torso and between an adult's and child's legs, and for the second gender portion 22 to engage the first gender portion 20.

A third strap 14 is provided that has two ends that are secured to the second strap 12 to form a sleeve. The third strap 14 can lie substantially parallel to the second strap 12 as shown, or the ends of the third strap 14 can be joined together and then secured to the second strap 12. The third strap can be secured to either the front or back of the second strap.

A fourth strap 16 is provided that is suitably sized for reaching around an adult's and child's torso when a child is sitting on the adult's lap. The fourth strap is also threaded through the sleeve formed by the second strap 12 and third strap 14. A third gender portion of a mating buckle assembly 24 is secured to one end of the fourth strap 16. A fourth gender portion of a mating buckle assembly 26 is adjustably secured to the other end of the fourth strap 16.

Although the third gender portion 24 is shown as a male portion, and the fourth gender portion 26 is shown as a female portion, selection of genders could have been switched. However, the third and fourth gender portions must be of opposite genders.

Figure 2:
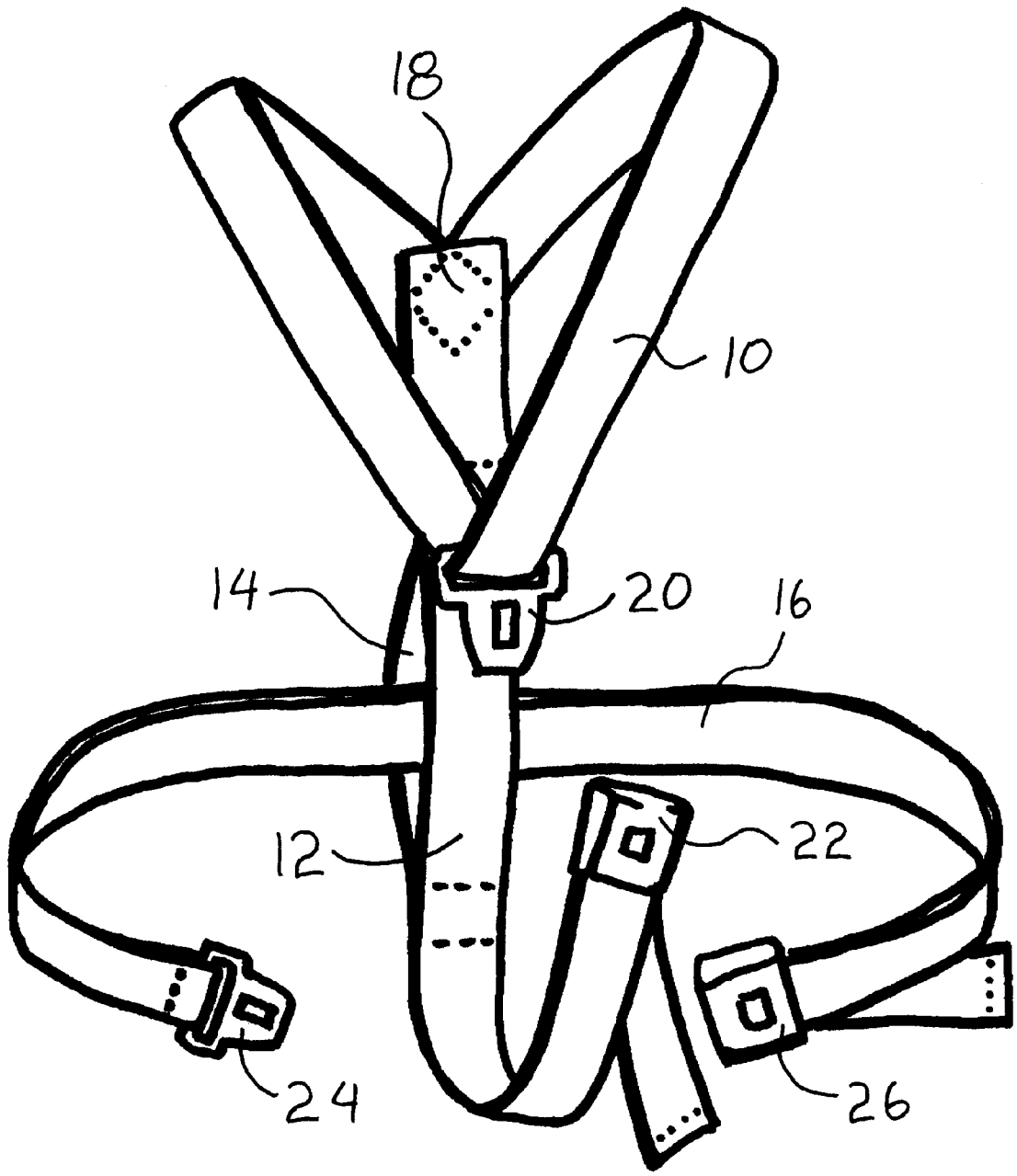
FIG. 2 is a view of an unsecured child safety harness according to a first embodiment as it fits around the adult and child, without showing the adult and child.

FIG. 2 shows the assembled child restraint harness as it is formed around the adult and child, without showing the adult and child. It is clear that the first strap 10 is adapted to fit over the heads of the adult and child, and rest on their shoulders. It is also clear how the first gender portion of the mating buckle assembly 20 engages with the second gender portion of a mating buckle assembly 22. The third gender portion 24 on the fourth strap 16 reaches around the adult's and child's torso to engage the fourth gender portion 26.

Figure 3:
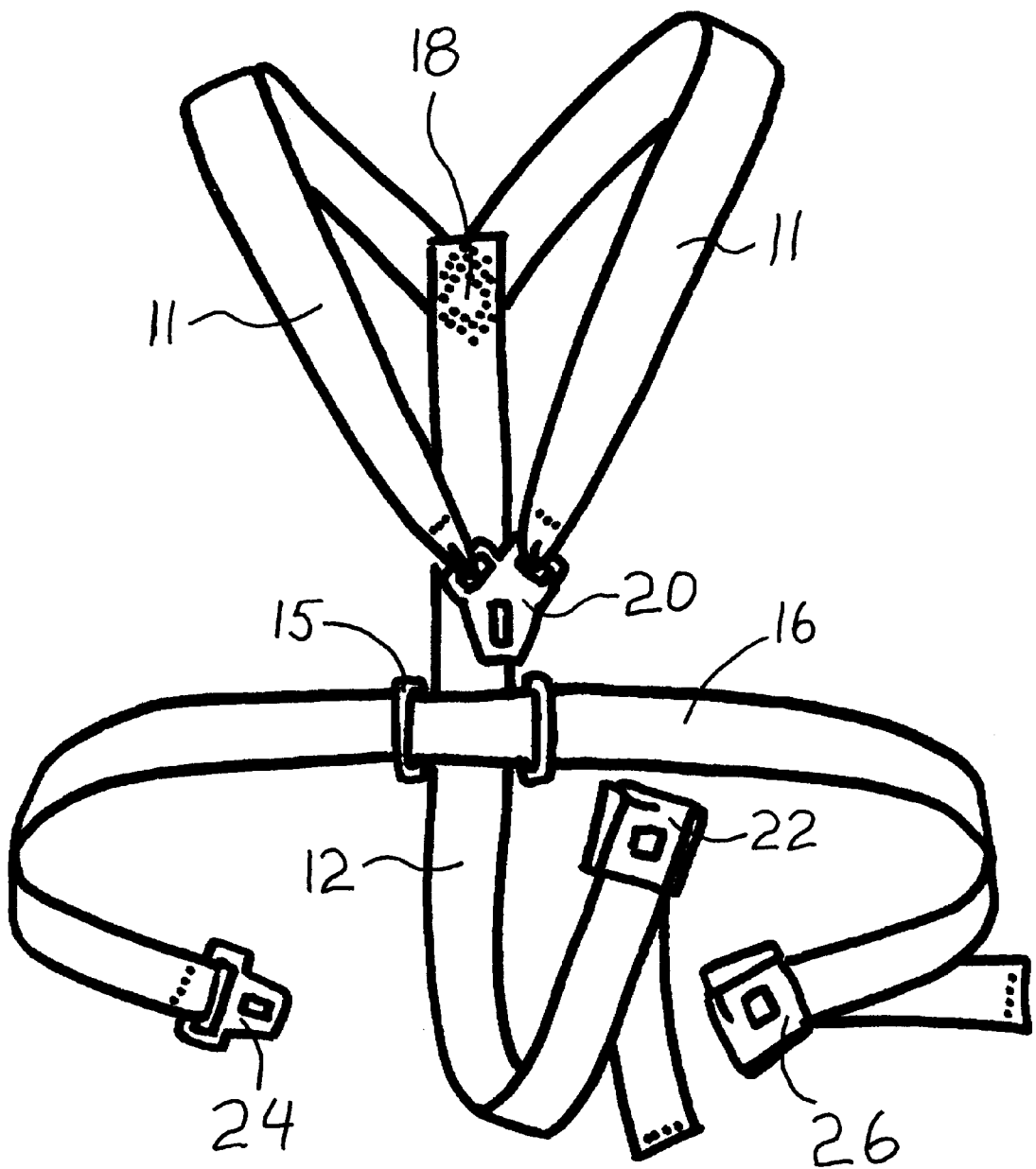
FIG. 3 is a view of an unsecured child safety harness according to a second embodiment as it fits around adult and child, without showing the adult and child.

FIG. 3 shows a second embodiment of the present invention. Instead of having one strap 10 forming a loop, there are two half straps 11 both secured at a junction 18 behind the adult, and secured at another end at a first gender portion of a mating buckle assembly 20. The first gender portion 20 is adapted to receive ends from the two half straps 11.

Another feature that can be used with either the first or second embodiment is the use of a dog bone restraint 15 instead of the third strap 14. Both the dog bone restraint and third strap 14 are slidable securing means for slidably securing the vertical second strap 12 to the horizontal fourth strap 16.

Figure 4:
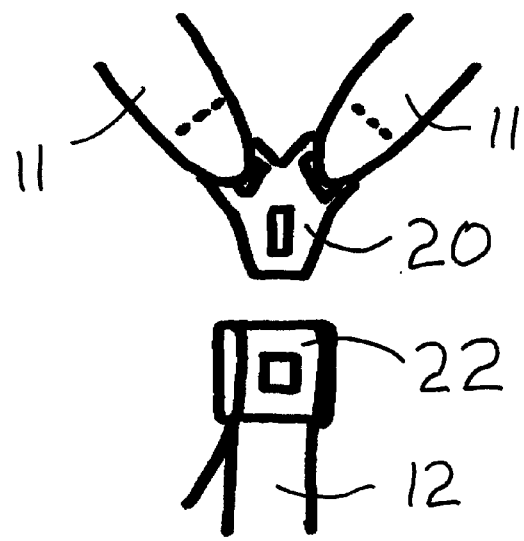
FIG. 4 is a detail view of the mating buckle assembly for the second embodiment.

FIG. 4 is a detail view of the second embodiment showing the two half straps 11 secured to a first gender portion 20 that is adapted to receive the ends of two half straps.

Figure 5:
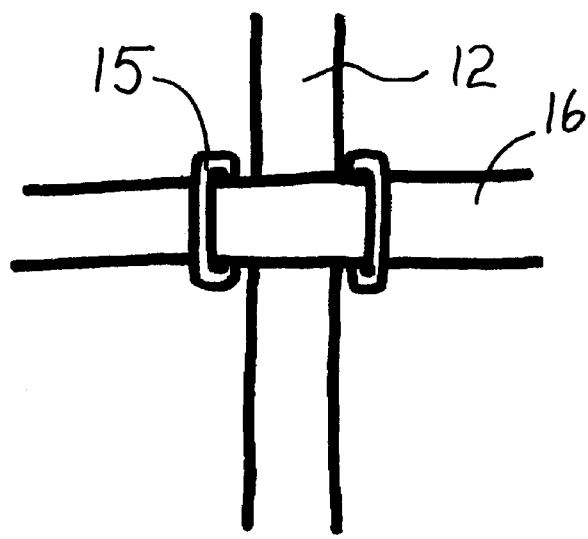
FIG. 5 is a detail view of a slidable securing means for a horizontal and vertical strap from the front.
Figure 6:
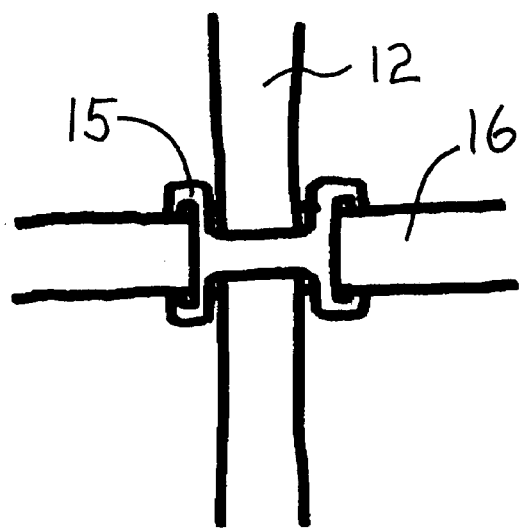
FIG. 6 is a detail view of the slidable securing means shown from the back.

FIGS. 5 and 6 are a detail views of the use of the dog bone restraint 15. The dog bone 15 can be made of any material, including but not limited to fabric, plastic, leather, and metal. There are two slots at either end of the restraint 15 suitably adapted for slidably receiving a strap such as the second strap 12 or the fourth strap 16. The material in the middle is longer than the straps are wide. The restraint 15 can be slid onto the fourth strap 16, and then the second strap 12 can be threaded through as shown. Alternatively, it can be slid onto the second strap 12, and then the fourth strap 16 can be threaded through. The orientation of the middle section can be either inside or outside, depending what is most comfortable.

Figure 7:
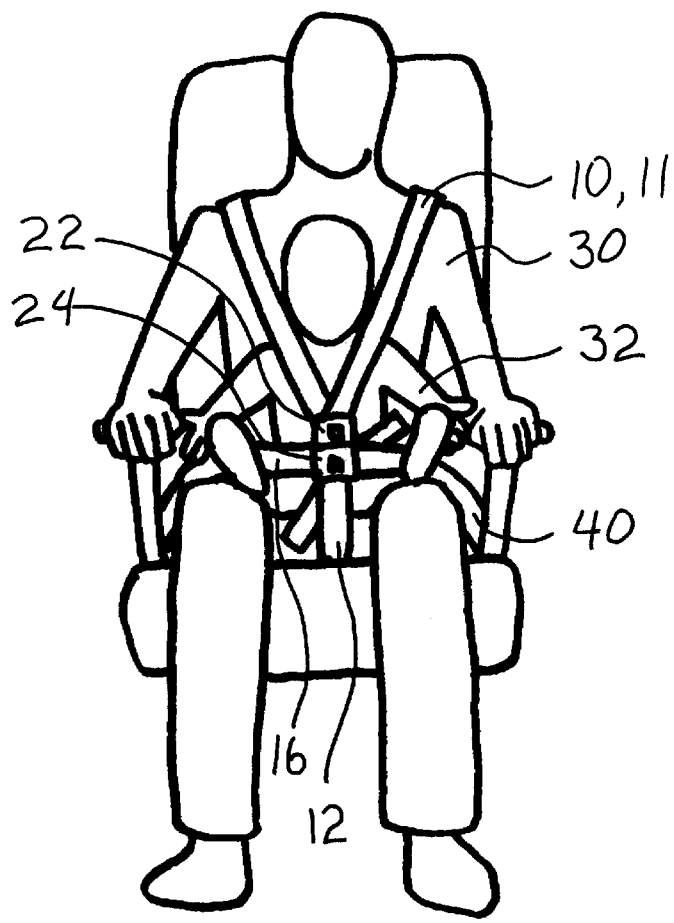
FIG. 7 is a front view of the child safety harness as used with an adult and child in a vehicle seat having a lap belt.

FIG. 7 is a front view of the child safety harness as used with an adult and child in a vehicle seat having a lap belt. A child 32 is secured to an adult 30 while seated in a vehicle having a lap belt 40. The first strap lays on the adult's shoulders, and also serves to restrain the child's shoulders. The fourth strap 16 fits snugly across the child's waist. The first gender portion of a mating buckle assembly 22 is shown engaging the second gender portion 24.

Figure 8:
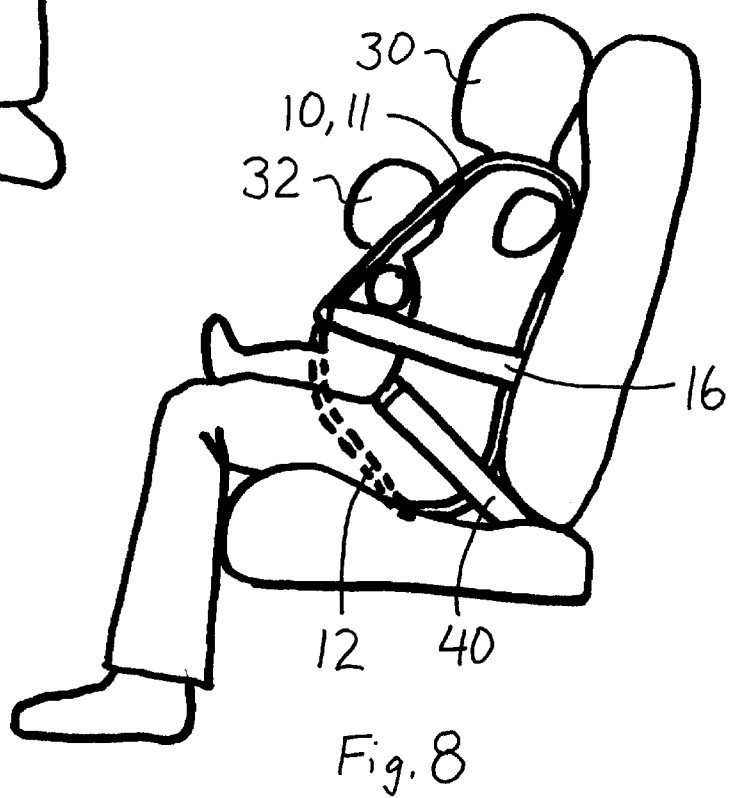
FIG. 8 is a side view of that which is shown in FIG. 3.

FIG. 8 is a side view of the invention in use as in FIG. 3. The fourth strap 16 is shown reaching around the torso of the adult 30 and safely restraining the child 32 at its waist. The adult is independently restrained to the seat by the lap belt 40. The mating buckle assemblies can be any buckles known in the art that are strong enough to withstand the forces of a child and adult in an emergency involving a sudden change in momentum or stop. Examples of such buckles include, but are not limited to, aircraft and automotive seat buckles.

In use, this apparatus can be effectively used in a method to quickly exit a vehicle in the event of an emergency. First the adult is secured to the vehicle using a restraining means. Such restraining means can include a lap belt, a shoulder belt, restraining bar, or a combination thereof.

Then, the child is secured to the adult using a means that is independent of the means for restraining the adult to the vehicle. Such a means includes, but is not limited to, the child safety harness apparatus as disclosed in this specification. Whereas the child safety harness as disclosed restrains supports a child at its waist when the adult is standing, other harnesses within the scope of this invention could support the child under its arms, or a combination of its waist and under its arms.

In an emergency in which the vehicle becomes disabled, the vehicle would suffer a great change in momentum, which likely means that it comes to a stop. Forces press the adult and child forward in their seat, However, the straps restrain them at their waist, between their legs, and by their shoulders. The child would not be restrained solely behind its back or at its waist, as is the case in the above referenced patents. The forces on their bodies would be more evenly distributed, thus helping to prevent injury.

When the vehicle has come to a stop and a doorway for leaving the vehicle has been made operational, the adult then merely unbuckles the lap belt and stands up still secured to the child. Although there may be smoke or debris in the vehicle, and other passengers may be in a panic, the adult and child can then quickly escape the vehicle together. They travel out of the vehicle as a unit, thus reducing confusion and the chance for injuring or losing the child.

The apparatus is small and light enough to carry in a small handbag, and is easy to use. When worn, it offers comfortable mobility to the adult and child. A safety device that is comfortable and easy to use will be more likely to be used, and will provide great benefits to adults traveling with children or infants.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A child safety harness for securing a child to an adult on a vehicle having lap safety belts comprising
   a. a first strap having two ends formed into a loop by securing each end together at a junction, said first strap suitably sized for placing over an adult's head and resting on an adult's shoulders;
   b. a first gender portion of a mating buckle assembly slidably secured to said first strap;
   c. a second strap suitably sized for reaching from said junction, under an adult's torso and between an adult's and child's legs, and reaching to engage said first gender portion of a mating buckle assembly, said second strap having a loop end and a buckle end, said loop end secured to the junction of the first strap, and said buckle end adjustably secured to
   d. a second gender portion of a mating buckle assembly, said second gender portion being the gender opposite that of the first gender portion;
   e. a third strap having two ends, each end being secured to said second strap, and said third strap being suitably adapted to form a sleeve when secured to said second strap, and being capable of receiving a strap within the sleeve;

f. a fourth strap suitably sized for reaching around an adult's and child's torso when a child is sitting on an adult's lap, said fourth strap threaded through said sleeve and having two ends;

g. a third gender portion of a mating buckle assembly secured to the first end of the fourth strap; and h. a fourth gender portion of a mating buckle assembly, said fourth gender portion being the gender opposite that of the third gender portion and adjustably secured to said fourth strap second end.

2. The harness of claim 1, said harness suitably adapted for securing a child to an adult so that the child is transported in a forward facing direction when the adult is sitting, standing, and walking.

3. The harness of claim 1, wherein said mating buckle assemblies are automotive seat belt buckles.

4. The harness of claim 1, wherein said mating buckle assemblies are airplane seat belt buckles.

5. The harness of claim 1, wherein said straps are suitably adapted to withstand at least forces a child would impart to an adult restrained by a lap belt in a vehicle seat in an event of a sudden change in momentum, without injuring the child and adult.

6. A method for securing a child to an adult that allows the child and adult to quickly exit a disabled vehicle in an emergency comprising the steps of a. securing an adult to a vehicle seat using a lap belt, b. securing a child to an adult's lap using a child safety harness, c. un-securing the lap belt from the adult after the vehicle becomes disabled, and d. the adult rising from the seat and going to safety while the child remains secured to the adult.

7. The method of claim 6, said child safety harness comprising a. a first strap having two ends formed into a loop by securing each end together at a junction, said first strap suitably sized for placing over an adult's head and resting on an adult's shoulders;

b. a first gender portion of a mating buckle assembly slidably secured to said first strap;

c. a second strap suitably sized for reaching from said junction, under an adult's torso and between an adult's and child's legs, and reaching to engage said first gender portion of a mating buckle assembly, said second strap having a loop end and a buckle end, said loop end secured to the junction of the first strap, and said buckle end adjustably secured to d. a second gender portion of a mating buckle assembly, said second gender portion being the gender opposite that of the first gender portion;

e. a third strap having two ends secured to said second strap, said third strap being suitably adapted to form a sleeve when secured to said second strap, and being capable of receiving a strap within the sleeve;

f. a fourth strap suitably sized for reaching around an adult's and child's torso when a child is sitting on an adult's lap, said fourth strap threaded through said sleeve and having two ends;

g. a third gender portion of a mating buckle assembly secured to the first end of the fourth strap; and h. a fourth gender portion of a mating buckle assembly, said fourth gender portion being the gender opposite that of the third gender portion and adjustably secured to said fourth strap second end.

8. The method of claim 7, wherein said mating buckle assemblies are automotive seat belt buckles.

9. The method of claim 7, wherein said mating buckle assemblies are airplane seat belt buckles.

10. A child safety harness for securing a child to an adult on a vehicle having lap safety belts comprising a. two half straps suitably sized for placing over an adult's head and resting on an adult's shoulders, each having a first end and a second end, said first ends secured together at a junction;

b. a first gender portion of a mating buckle assembly secured to said second ends of said half straps;

c. a second strap suitably sized for reaching from said junction, under an adult's torso and between an adult's and child's legs, and reaching to engage said first gender portion of a mating buckle assembly, said second strap having a junction end and a buckle end, said junction end secured to the junction of the first strap, and said buckle end adjustably secured to d. a second gender portion of a mating buckle assembly, said second gender portion being the gender opposite that of the first gender portion;

e. a slidable securing means for slidably securing the second strap to f. a fourth strap suitably sized for reaching around an adult's and child's torso when a child is sitting on an adult's lap, said fourth strap threaded through said sleeve and having two ends;

g. a third gender portion of a mating buckle assembly secured to the first end of the fourth strap; and h. a fourth gender portion of a mating buckle assembly, said fourth gender portion being the gender opposite that of the third gender portion and adjustably secured to said fourth strap second end.

11. The harness of claim 10, said harness suitably adapted for securing a child to an adult so that the child is transported in a forward facing direction when the adult is sitting, standing, and walking.

12. The harness of claim 10, wherein said mating buckle assemblies are automotive seat belt buckles.

13. The harness of claim 10, wherein said mating buckle assemblies are airplane seat belt buckles.

14. The harness of claim 10, wherein said straps are suitably adapted to withstand at least forces a child would impart to an adult restrained by a lap belt in a vehicle seat in an event of a sudden change in momentum, without injuring the child and adult.

15. The harness of claim 10, wherein the slidable securing means comprise a dog bone restraint.

16. The harness of claim 10, wherein the slidable securing means comprise a third strap having two ends secured to the second strap, thereby forming a sleeve that is adapted to receive another strap therethrough.

* * * * *